United States Patent
Wenzel et al.

(10) Patent No.: US 7,139,829 B2
(45) Date of Patent: Nov. 21, 2006

(54) IDENTIFICATION OF UNUSED RESOURCES IN A PACKET DATA NETWORK

(75) Inventors: Peter Wenzel, Plano, TX (US); Kuntal Chowdhury, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 777 days.

(21) Appl. No.: 10/135,617

(22) Filed: Apr. 30, 2002

(65) Prior Publication Data

US 2002/0167905 A1 Nov. 14, 2002

Related U.S. Application Data

(60) Provisional application No. 60/289,438, filed on May 8, 2001.

(51) Int. Cl.
*G06F 15/16* (2006.01)
(52) U.S. Cl. ............... 709/232; 455/412.1; 455/421; 455/456.1
(58) Field of Classification Search .......... 709/203, 709/227, 228, 232; 370/254, 340, 349, 369, 370/249, 313; 455/412.1, 421, 456.2
See application file for complete search history.

(56) References Cited

U.S. PATENT DOCUMENTS

| 5,142,533 A | * | 8/1992 | Crisler et al. | 370/349 |
| 5,708,655 A | * | 1/1998 | Toth et al. | 370/313 |
| 5,708,656 A | * | 1/1998 | Noneman et al. | 370/335 |
| 5,710,885 A | * | 1/1998 | Bondi | 709/224 |

(Continued)

OTHER PUBLICATIONS

W. Simpson, "The point-to-Point Protocol (PPP)", Jul. 1994, RFC 1661, NWG, 54 pages.*

(Continued)

*Primary Examiner*—Thong Vu
*Assistant Examiner*—Hai V. Nguyen
(74) *Attorney, Agent, or Firm*—Garlick Harrison & Markison; James A. Harrison

(57) ABSTRACT

A packet data service node is formed to establish an "always on" connection with a mobile terminal by way of a packet control function card or device with the ability to determine when a mobile terminal no longer requires a previously established point-to-point protocol communication link. More specifically, the PDSN formed according to one embodiment of the present invention, includes an inactivity timer and corresponding logic to prompt it to generate an LCP Echo Request to the mobile terminal after expiration of the inactivity timer. Each time data or control signals are received from the mobile terminal, the inactivity timer is reset. Upon expiration of the timer, the PDSN generates the LCP Echo Request. In one embodiment of the invention, the LCP Echo Request is generated at least once and a total of three times prior to the release of network resources responsive to not receiving an LCP Echo Reply from the mobile terminal, which it should have generated had it received the LCP Echo Request generated by the PDSN. Logic defined by the PDSN and its corresponding method of operation facilitates the release of resources being wasted by a mobile terminal that no longer needs as determined by failure of the mobile terminal to respond with an LCP Echo Reply.

19 Claims, 7 Drawing Sheets

U.S. PATENT DOCUMENTS

| | | | | |
|---|---|---|---|---|
| 5,781,537 | A * | 7/1998 | Ramaswami et al. | 370/254 |
| 5,999,091 | A * | 12/1999 | Wortham | 340/431 |
| 6,269,449 | B1 * | 7/2001 | Kocis | 713/310 |
| 6,371,575 | B1 * | 4/2002 | Lewis et al. | 303/128 |
| 6,424,639 | B1 * | 7/2002 | Lioy et al. | 370/338 |
| 6,487,218 | B1 * | 11/2002 | Ludwig et al. | 370/469 |
| 6,519,233 | B1 * | 2/2003 | Gutierrez | 370/320 |
| 6,542,734 | B1 * | 4/2003 | Abrol et al. | 455/412.1 |
| 6,563,821 | B1 * | 5/2003 | Hong et al. | 370/389 |
| 6,611,868 | B1 * | 8/2003 | Arutyunov | 709/227 |
| 6,629,261 | B1 * | 9/2003 | Chintada et al. | 714/4 |
| 6,744,780 | B1 * | 6/2004 | Gu et al. | 370/450 |
| 6,766,173 | B1 * | 7/2004 | Chun et al. | 455/450 |
| 6,785,823 | B1 * | 8/2004 | Abrol et al. | 726/7 |
| 6,834,050 | B1 * | 12/2004 | Madour et al. | 370/392 |
| 6,862,276 | B1 * | 3/2005 | Abrol et al. | 370/349 |
| 6,912,214 | B1 * | 6/2005 | Madour et al. | 370/340 |
| 6,978,128 | B1 * | 12/2005 | Raman et al. | 455/414.1 |
| 6,993,010 | B1 * | 1/2006 | Peshkin | 370/352 |
| 6,999,435 | B1 * | 2/2006 | Perras | 370/331 |
| 7,054,291 | B1 * | 5/2006 | Balazinski et al. | 370/331 |
| 7,065,062 | B1 * | 6/2006 | Madour et al. | 370/331 |
| 2001/0018342 | A1 * | 8/2001 | Vialen et al. | 455/423 |
| 2002/0049875 | A1 * | 4/2002 | Giora et al. | 710/301 |
| 2002/0055364 | A1 * | 5/2002 | Wang et al. | 455/466 |
| 2002/0068570 | A1 * | 6/2002 | Abrol et al. | 455/438 |
| 2002/0087623 | A1 * | 7/2002 | Eatough | 709/203 |
| 2002/0160812 | A1 * | 10/2002 | Moshiri-Tafreshi et al. | 455/561 |
| 2002/0186696 | A1 * | 12/2002 | Lim | 370/395.52 |
| 2005/0021770 | A1 * | 1/2005 | Helm et al. | 709/228 |
| 2006/0111098 | A1 * | 5/2006 | Abdel-Kader et al. | 455/421 |
| 2006/0141992 | A1 * | 6/2006 | Maurice | 455/412.1 |

OTHER PUBLICATIONS

Intel, "Intel PRO/Wireless 2011 LAN Access Point", Product Reference Guide, Version 2.00-03, Jul. 2000, 54 pages.*

SAMSUNG Electronics, "3GPP2 TSG-P Wireless Packet Data Networking", Meeting Summary, Meeting # 24, Apr. 9-12, 2001, 8 pages.*

SAMSUNG Electronis, "3GPP2 TSG-P Wireless Packet Data Networking", Meeting Summary # 25, May 7-11, 2001, 8 pages.*

CISCO, "Cisco Packet Data Serving Node (PDSN)", 2003, Release version 2.0, 114 pages.*

3GPP2, "CDMA200 Wireless IP Network Standard: Simple IP and Mobile IP Access Services", Aug. 2003, version 1.0.0, 44 pages.*

"Linux PPP HOWTO"; HOW TOS, Online; Oct. 19, 2000; pp. 51-56; XP002239560; Retrieved from Internet: <URL:www.ibiblio.org/pub/Linux/docs/HOWTO/other-formats/pdf/>; pp. 54-55.

Chua M et al; "Mobile PPP"; Internet Engineering Task Force Internet Draft, XX, XX, Jun. 1999; pp. 1-15; XP002198913; p. 4; pp. 8-9.

Garg V K et al; "Mobile IP for 3G Wireless Networks"; IEEE, XP010534050; p. 240, left-hand column-p. 241, left-hand column.

Beyssac P; "Bandwidth Ping"; Internet; Aug. 4, 1995, pp. 1-5, XP002230332; Retrieved from the Internet: <URL:http//www.cnam.fr/reseau/bing.html>; whole document.

Simpson, W; "RFC1661—the Point-to-Point Protocol (PPP)"; RFC, Online; Jul. 1994; pp. 1-52; XP002239561; Retrieved from Internet: <URL:www.rfc-editor.org>; pp. 6-9.

* cited by examiner

IDENTIFICATION OF UNUSED RESOURCES IN A PACKET DATA NETWORK

CROSS REFERENCE TO RELATED APPLICATION

This application is related to, incorporates by reference and claims priority to Provisional Application for Patent having a title of A METHOD FOR IDENTIFYING ALLOCATED RESOURCES NO LONGER BEING USED IN A PACKET DATA NETWORK and having a Ser. No. of 60/289,438 and a filing date of May 8, 2001.

BACKGROUND

1. Field of the Invention

The present invention relates to mobile communication devices and, more particularly, the present invention relates to mobile terminals capable of communicating in a data-only mode with a data network, as well as mobile terminals capable of communicating in voice and data modes.

2. Related Art

Wireless communication service providers, as well as Internet service providers, face some difficult challenges as the various networks are increasingly modified to work together to provide seamless end-to-end call connectivity across the various platforms. Ever-increasing residential dial-up subscribers demand available modem (or ISDN) ports, or threaten to take their business elsewhere. To meet this demand, Internet service providers are deploying a large number of complex, port-dense network access servers (NAS) to handle thousands of individual dial-up connections. As such, small and large, as well as private and public, wireless data networks are being created to seamlessly interact with large wire line networks to enable users to establish point-to-point connections independent of terminal type and location. Traditionally, however, voice networks have paved the way for the creation of data networks as users loaded the voice networks trying to transmit data, including streaming data (video and voice). Initially, traditional Public Switched Telephone Networks (PSTNs) were used for data transmissions but have been largely supplanted by data packet networks, including various versions of the "Internet".

The wireless domain has had a parallel history. Initial voice networks, including AMPS, Time Division Multiple Access (TDMA) including North American TDMA and Global System for Mobile Communications (GSM), were used to conduct data in a limited capacity. These networks are being replaced, however, by newer wireless data-only networks, as well as data and voice networks.

The structure and operation of wireless communication systems are generally known. Examples of such wireless communication systems include cellular systems and wireless local area networks, among others. Equipment that is deployed in these communication systems is typically built to support standardized operations, i.e., operating standards. These operating standards prescribe particular carrier frequencies, modulation types, baud rates, physical layer frame structures, MAC layer operations, link layer operations, etc. By complying with these operating standards, equipment interoperability is achieved.

In a cellular system, a regulatory body typically licenses a frequency spectrum for a corresponding geographic area (service area) that is used by a licensed system operator to provide wireless service within the service area. Based upon the licensed spectrum and the operating standards employed for the service area, the system operator deploys a plurality of carrier frequencies (channels) within the frequency spectrum that support the subscriber units within the service area. Typically, these channels are equally spaced across the licensed spectrum. The separation between adjacent carriers is defined by the operating standards and is selected to maximize the capacity supported within the licensed spectrum without excessive interference. In most cases, severe limitations are placed upon the amount of co-channel and adjacent channel interference that may be caused by transmissions on a particular channel.

In cellular systems, a plurality of base stations is distributed across the service area. Each base station services wireless communications within a respective cell. Each cell may be further subdivided into a plurality of sectors. In many cellular systems, e.g., GSM cellular systems, each base station supports forward link communications (from the base station to subscriber units) on a first set of carrier frequencies, and reverse link communications (from subscriber units to the base station) on a second set of carrier frequencies. The first set and second set of carrier frequencies supported by the base station are a subset of all of the carriers within the licensed frequency spectrum. In most, if not all, cellular systems, carrier frequencies are reused so that interference between base stations using the same carrier frequencies is minimized and system capacity is increased. Typically, base stations using the same carrier frequencies are geographically separated so that minimal interference results.

Traditional wireless mobile networks include Mobile Station Controllers (MSCs), Base Station Controllers (BSCs) and Base Transceiver Station (BTS) systems that jointly operate to communicate with mobile stations over a wireless communication link. Examples of common networks include the GSM networks, North American TDMA networks and Code Division Multiple Access (CDMA) networks. Extensive infrastructures (e.g., ANSI-41 or MAP-based networks) exist in the cellular wireless networks for tracking mobility, distributing subscriber profiles, and authenticating physical devices.

To establish a wireless communication link in traditional wireless voice networks, an MSC communicates with a BSC to prompt the BTS (collectively "Base Station" or "BS") to generate paging signals to a specified mobile station within a defined service area typically known as a cell or sector (a cell portion). The mobile station, upon receiving the page request, responds to indicate that it is present and available to accept an incoming call. Thereafter, the BS, upon receiving a page response from the mobile station, communicates with the MSC to advise it of the same. The call is then routed through the BS to the mobile station as the call setup is completed and the communication link is created. Alternatively, to establish a call, a mobile station generates call setup signals that are processed by various network elements in a synchronized manner to authenticate the user as a part of placing the call. The authentication process includes, for example, communicating with a Home Location Register (HLR) to obtain user and terminal profile information.

The next generation of cellular networks presently being developed are being modified from traditional systems to create the ability for mobile stations to receive and transmit data in a manner that provides greatly increased throughput rates. For example, many new mobile stations, often referred to as mobile terminals or access terminals, are being developed to enable a user to surf the web or send and receive e-mail messages through the wireless mobile terminal, as well as to be able to receive continuous bit rate data, including so called "streaming data". Accordingly, different systems and networks are being developed to expand such capabilities and to improve their operational characteristics.

One example of a system that is presently being deployed with voice and data capabilities is the CDMA2000 network. The CDMA2000 network, however, is developed from the IS-95 networks that were optimized for voice transmissions and therefore is not optimized for transmitting data even though its data transport capability is significantly improved from prior art networks and systems. More formally, the 1×RTT standard defines CDMA operation for data transmissions.

One data-only network that is being developed is defined by the 1×EVDO standard. The 1×EVDO standard defines a time burst system utilizing a 1.25 MHz carrier that is set at a carrier frequency that is adjacent to the frequencies used by the voice networks. In one particular network, a 1.67 millisecond (mS) burst is used for the forward link in a 1×EVDO network. Typical 1×EVDO networks include a Packet Data Service Node (PDSN) for performing routing and switching for a data packet or data packet stream, an Access Network Controller (ANC) that establishes and manages the wireless communication link with the mobile terminal, and a Packet Control Function (PCF) that is largely an interface device for converting signals between the packet domain and a wireless network that will be used for the communication link.

The 1×EVDO network is optimized for forward link data applications. The next generation of 1×RTT networks that are being deployed can communicate with voice and data networks but do not process data as efficiently as the networks formed according to the 1×EVDO standard. Newer networks are also being designed and have evolved from the 1×EVDO standard, including 1×EVDV, which is for transmitting data as well as voice.

The 1×EVDO networks that have been previously described are not formed, however, to interact seamlessly between the voice and data networks. For example, the 1×EVDO networks do not have or fully utilize Signaling System Number 7 (SS7) type network components to assist with call setup, user and mobile station authentication, call routing, and feature delivery. The 1×EVDO networks are formed to carry data only and do not include the full functionality and capabilities of wireless voice networks. The infrastructure of the 1×EVDO network is different and simpler than SS7-based voice networks (wire line or wireless).

1×EVDO does not provide all hand-off capabilities and functionality of typical voice networks. Accordingly, present mobile terminals only provide some of these traditional voice network features and, in some cases, only in a rudimentary way. For example, the designs in the 1×EVDO standard only provide for user authentication, not terminal authentication. Because traditional SS7-type network components are not fully available in 1×EVDO networks, compatibility and control problems are readily noticeable.

One problem that has been identified in some packet data networks, including 1×EVDO and 1×RTT networks is that a connected mobile terminal in a dormant state may be geographically moved to a new cell area in a manner that a serving network element from an original cell area is not aware that the mobile terminal has moved and thus continues to allocate and reserve resources to the mobile terminal thereby wasting network resources. One approach to solving this problem is to merely tear down a connection after a period of time. While this approach would reclaim the unused resources for a dormant and migrating mobile terminal, it flies against a basic desire to create a system that supports an "always connected" mode of operation for wireless terminals similar to the same type of feature for wireline user terminals that are connected to the Internet or other data packet networks through a broadband connection such as DSL or cable modem. What is needed, therefore, is an efficient way of reclaiming network resources without obliterating the concept of having an always connected wireless mobile terminal.

SUMMARY OF THE INVENTION

A packet data service node is formed to establish an "always on" connection with a mobile terminal by way of a packet control function card or device with the ability to determine when a mobile terminal no longer requires a previously established point-to-point protocol communication link. More specifically, the PDSN formed according to one embodiment of the present invention, includes an inactivity timer and corresponding logic to prompt it to generate a Link Control Protocol (LCP) Echo Request to the mobile terminal after expiration of the inactivity timer. In the described embodiment of the invention, the inactivity is initially set to a value that is a plurality of hours long. The inactivity timer is reset each time data or control signals are received from the mobile terminal. Upon expiration of the timer, the PDSN generates the LCP Echo Request ("Ping") if transmitted at layer 2 of a point-to-point protocol. Alternatively, an ICMP Echo Request may be transmitted at an IP protocol network layer 3. In one embodiment of the invention, the LCP Echo Request is generated at least once and a total of three times prior to the release of network resources responsive to not receiving an LCP Echo Reply from the mobile terminal, which it should have generated had it received the LCP Echo Request generated by the PDSN.

Accordingly, the logic defined by the PDSN and its corresponding method of operation facilitates the release of resources being wasted by a mobile terminal whose packet session is "stale" in that it no longer needs the radio network resources in a manner which minimizes an impact to the network when determining that the point-to-point protocol communication link should be released or torn down. In an alternate embodiment of the present invention, to further reduce the impact to the network, a lower number of LCP Echo Requests are generated before the PDSN determines that the point-to-point protocol communication link should be torn down. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
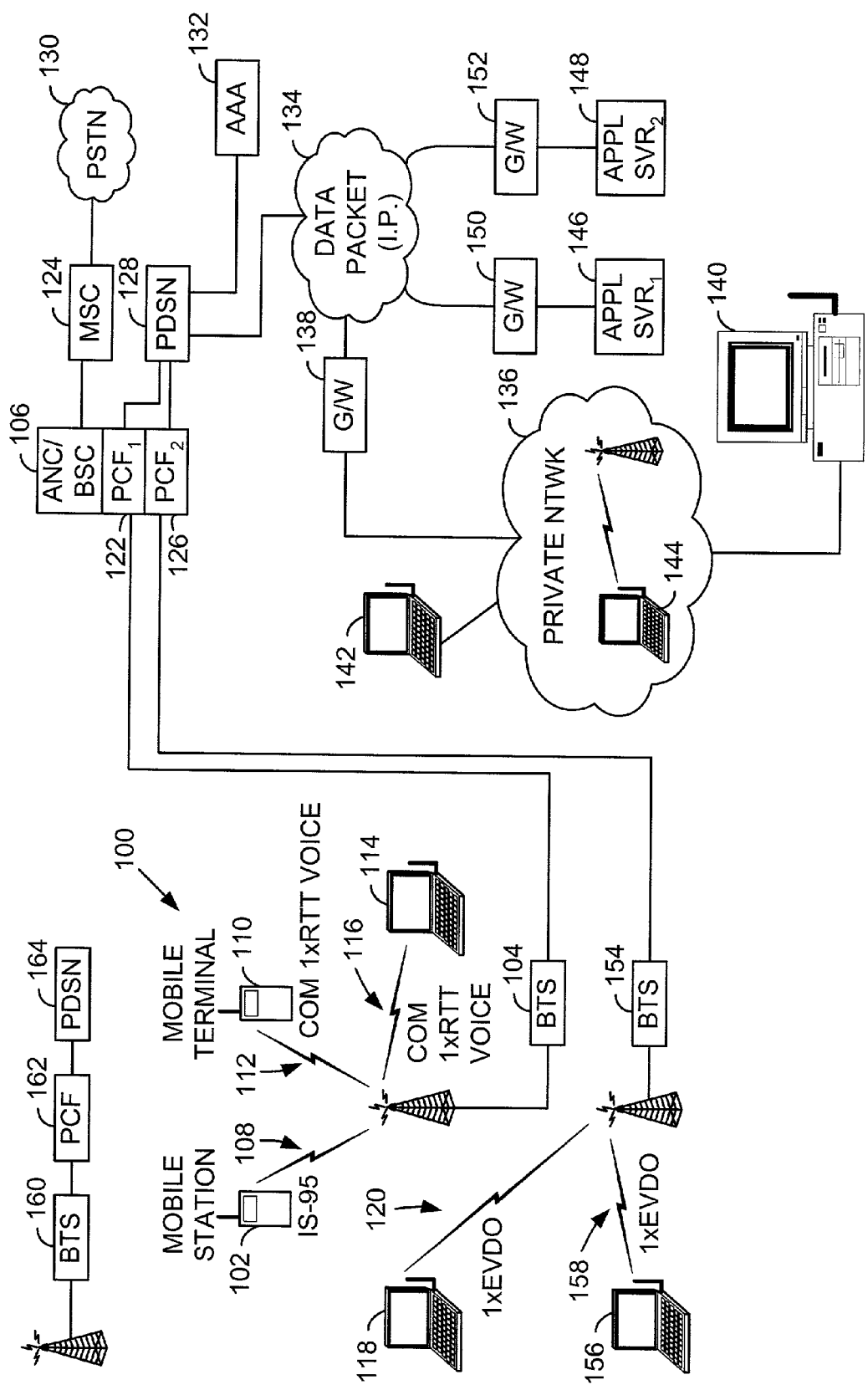
FIG. 1 is a functional block diagram of a communication network formed according to one embodiment of the present invention.

FIG. 1 is a functional block diagram of a communication network formed according to one embodiment of the present invention. As may be seen, a communication network 100 includes many networks that are coupled to operatively communicate with each other to enable a user in one type of network to communicate with a user in a different type of network. For example, the communication network 100 creates an ability for a wire line user terminal coupled to a private network to communicate with a mobile terminal through a wireless communication link. Such transparent operation with respect to the user is improving access to information and the ability for individuals to communicate to a level that is unprecedented. As discussed before, existing wireless networks have, heretofore, been adapted primarily for carrying voice calls. Accordingly, when used in conjunction with a computer terminal, the wireless voice networks were able to transmit or receive data at rates that today are viewed as unacceptably slow although they were appreciated at the outset.

Along these lines, a mobile station 102 is located within a geographic area served by a Base Transceiver Station (BTS) 104 that is coupled to a Base Station Controller (BSC) 106. More specifically, mobile station 102 communicates with BTS 104 by way of an IS-95 CDMA wireless communication network link shown generally at 108. Similarly, a mobile terminal 110 that is capable of supporting both voice and data calls communicates with BTS 104 over a wireless communication link shown generally at 112 and establishes either voice calls or data calls under the CDMA2000 1xRTT protocols. In the example herein, mobile terminal 110 is engaged in a voice call, as defined by a service option generated by a mobile terminal during call setup, and thus wireless communication link 112 is transmitting merely voice signals and associated control signaling.

Similarly, a mobile terminal 114 is engaged in a data call according to 1xRTT protocols over a wireless communication link shown generally at 116. Finally, a mobile terminal 118 is engaged in a data call over a wireless communication link, shown generally at 120, according to 1xEVDO protocols in a so called "simple-IP" or "mobile-IP" network, as those terms are understood by one of average skill in the art. In general, simple-IP and mobile-IP networks do not include control-signaling protocols that are as extensive as some existing systems. In particular, simple-IP and mobile-IP networks do not include a "heartbeat" mechanism used to determine that a wireless terminal is present and in an operation mode of operation.

The 1xEVDO network of the described embodiment is a high data rate, high performance and cost effective wireless data packet solution that offers high capacity and is optimized for packet data services. It provides a peak data rate, under current technology, of 2.4 Mbps within one CDMA carrier operating at a bandwidth of 1.2 MHz and supports Internet protocols and further facilitate an "always on" connection so that users are able to rapidly send and receive wireless data. Along these lines, the 1xEVDO network is formed to support connectionless communication links in contrast to traditional connection-oriented networks, such as the PSTN, and transmits Protocol Data Units (PDUs) which comprise data packets layered in a protocol such as an IP protocol. In general, the 1xEVDO transmits the PDUs in a bursty fashion notwithstanding its underlying CDMA technology. For hybrid mobile terminals capable of supporting both voice and data calls, the 1xEVDO transmits the PDUs for the data on separate 1.25 MHz channels with respect to voice thereby achieving higher system capacity.

1xEVDO network topology is a little different from traditional wireless networks, including 1xRTT data networks. More specifically, while wireless voice networks and 1xRTT data networks all include the use of a BSC and MSC for call control and call routing, a 1xEVDO system merely communicates through the radio with ANC that in turn communicates with a packet data serving node which in turn is coupled to a data packet network such as the Internet.

Continuing to examine FIG. 1, BTS 104 is coupled to communicate with ANC/BSC 106. As is understood by one of average skill in the art, Access Network Controllers (ANCs) and Base Station Controllers (BSCs) have similar functionality. Moreover, Packet Control Function Cards can be installed either within a BSC or within an ANC according to whether the PCF is to communicate with a 1xRTT device or a 1xEVDO device, respectively. Additionally, in one embodiment of the invention, one ANC/BSC is formed with 1xRTT and 1xEVDO equipment therewithin to be multi-network capable. Thus, the embodiment of FIG. 1 contemplates such a configuration although it is to be understood that the BSC and ANC elements may readily be separated or formed as stand alone units.

Within ANC/BSC 106, according to one embodiment of the present invention, a plurality of different wireless network cards are included to facilitate communications with mobile stations and mobile terminals of differing protocols and types. For example, in the described embodiment, ANC/BSC 106 includes circuitry to communicate with mobile station 102 over IS-95 CDMA wireless communication network link as shown generally at 108. ANC/BSC 106 further includes a Packet Control Function (PCF) card 122 for communicating with mobile terminals 110 and 114 utilizing 1xRTT protocols in one described embodiment of the invention. As may be seen, PCF 122, which is for communicating with 1xRTT protocol devices, is coupled to an MSC 124. A PCF 126, however, is for communicating with 1xEVDO devices and thus it is coupled directly to a Packet Data Serving Node (PDSN) 128. Thus, mobile terminal 118 that communicates over wireless communication link 120 according to 1xEVDO communication protocols, communicates with BTS 154 and with PCF 126 formed within ANC/BSC 106 according to one embodiment of the present invention. It is understood, of course, that PCF 126 may readily be formed as a distinct device rather than within a rack of ANC/BSC 106. Moreover, PCF 126 may communicate with mobile terminal 118 through distinct radio equipment and, thus, through a BTS other than BTS 154 as shown herein.

MSC 124 further is coupled to a PSTN 130. Accordingly, calls routed through MSC 124 are directed either to other MSCs (not shown herein) or to external networks by way of PSTN 130. The reference to PSTN herein includes SS7 and other similar "intelligent networks". Thus, a gateway device (not shown herein) coupled to PSTN 130, may be used to access a data packet network, such as the Internet, for any data calls transmitted according to 1xRTT protocols. 1xEVDO calls, which are processed by PCF 126, however, are forwarded through PDSN 128, which, upon authentication by an Authentication, Authorization and Accounting (AAA) server 132, is connected to a data packet network, such as a data packet network 134, which, in this example, comprises the Internet. As may further be seen, data packet network 134 is coupled to a private network 136 by way of a gateway device 138. Private network 136 further is coupled through traditional wire line networks to a user terminal 140 and 142. Moreover, in the described embodiment of the invention, private network 136 includes a wireless LAN formed according to 802.11b protocol standards that facilitates connection to a wireless terminal 144.

Data packet network 134 further is coupled to a plurality of application servers, such as application servers 146 and 148 by way of gateway devices 150 and 152, respectively. Continuing to refer to FIG. 1, ANC/BSC 106 further is coupled to a BTS 154, which is in communication with a mobile terminal 156 by way of a 1×EVDO communication link 158. As may be seen, mobile terminal 156 is served by PCF 126, as is mobile terminal 118, although they are served by different BTSs, namely BTSs 154 and 104, respectively. Additionally, however, a BTS 160 is coupled to a PCF 162 that, in turn, is coupled to communicate with a PDSN 164.

Any one of the 1×EVDO wireless terminals 156 or 118 may also communicate through PCF 162 and PDSN 164 whenever they travel through a geographic region that is served by BTS 160. In the described embodiment, PCF 162 is formed in a distinct device and is not formed as a card within a BSC as was the case with PCF 122 and PCF 126. As will be described in greater detail below, the present invention deals in part with the situation in which a data packet session has been established between a mobile terminal in which the mobile terminal and its corresponding session become dormant and, thereafter, the mobile terminal transitions to a service area covered by a different PDSN. Accordingly, if, for example, mobile terminal 156 transition to a new service area, for example, mobile terminal 156 transitions from a service area that is served by PDSN 128 to a service area that is served by PDSN 164, all while in a dormant state, PDSN 128 heretofore would not have a way of determining that the communication link 158 may be released and reserved resources for mobile terminal 156 be assigned to a new user as necessary.

Figure 2:
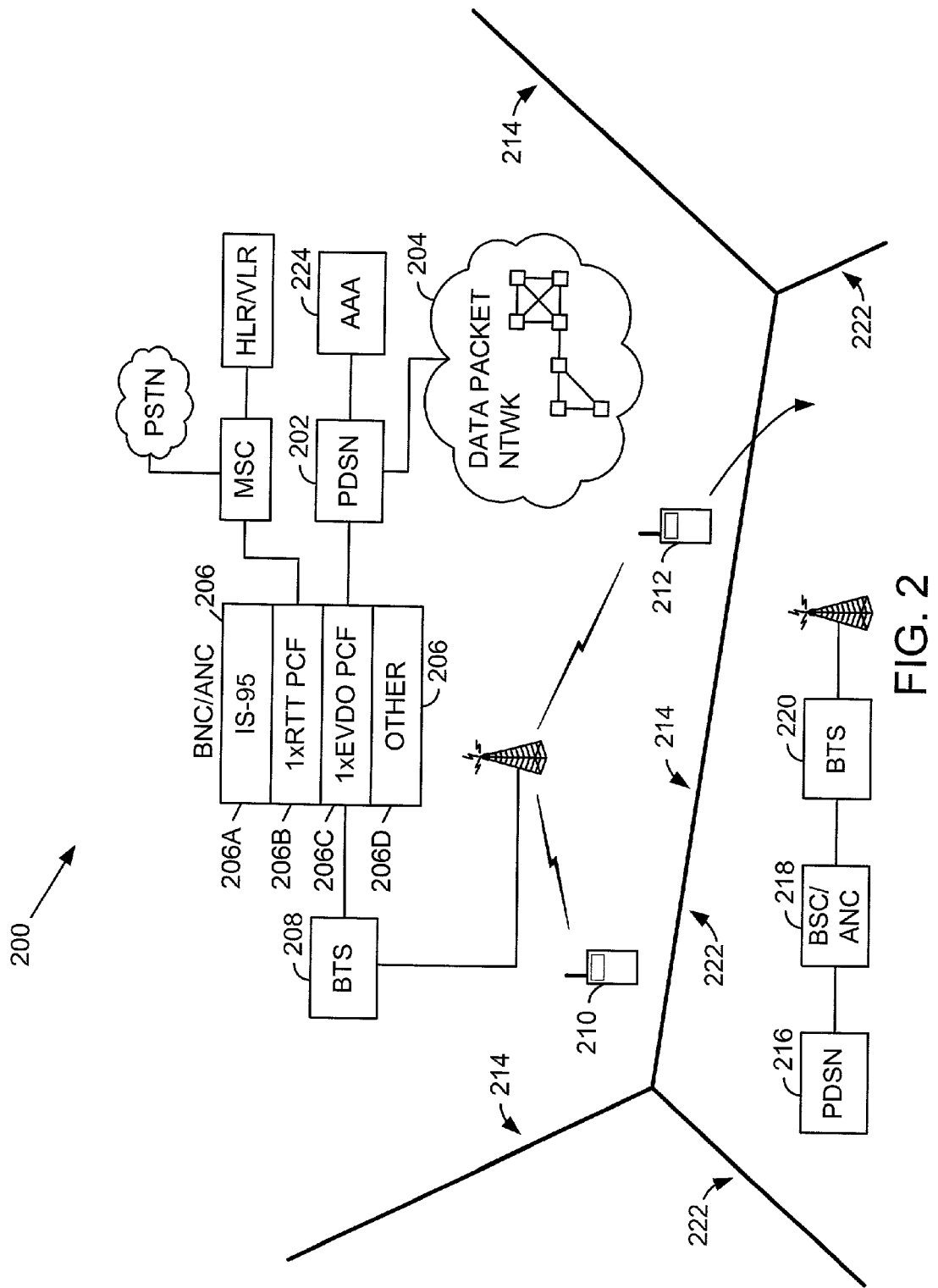
FIG. 2 is a functional block diagram that illustrates one embodiment of the present invention.

FIG. 2 is a functional block diagram that illustrates one embodiment of the present invention. As may be seen, a PDSN 202 is coupled to a data packet network 204, as well as to a BSC/ANC 206. As is known by one of average skill in the art, an access network control (ANC) provides functionality similar to that of base station controllers. Given the present embodiment in which cards of the different network types that operate according to different protocols are all formed within one box, the described example includes a box 206 that provides BSC/ANC functionality and, accordingly, is referenced as such. More particularly, BSC/ANC 206 includes an IS-95 card 206A, a 1×RTT PCF card 206B, a 1×EVDO PCF card 206C, in addition to other circuitry shown at 206D. Moreover, as systems evolve and, for example, 1×EVDO migrates to providing support for voice calls also, card 206C may well be replaced by a 1×EVDV PCF card which supports both voice and data calls. BSC/ANC 206 further is coupled to a BTS 208 that communicates with a plurality of mobile terminals 210 and 212. Moreover, as may be seen, BTS 208 serves mobile terminals 210 and 212 that are within a defined geographic area represented by geographic marker 214. Geographic marker 214 may, for example, represent the boundaries of a wireless cell which, for a 1×EVDO system may not necessarily correspond to a defined cell area for a voice network, such as an IS-95 network served by IS-95 card 206A.

Data packet network 204 includes a plurality of switches that serve to route individual data packets to a terminating destination as is known by those of average skill in the art. While not shown explicitly here, it is understood, that data packet network 204 further is coupled to gateway devices and servers of other types for creating a point-to-point protocol communication link with mobile terminals, such as mobile terminal 210 and 212.

Continuing to refer to FIG. 2, it may be seen that the network shown generally at 200 further includes a second PDSN 216 that is coupled to a BSC/ANC 218 that further is coupled to a BTS 220 that defines a second cell area as indicated by geographic marker 222. As may be seen, mobile terminal 212 is headed in a direction to transition from the cell area served by BTS 208 to a cell area served by BTS 220. For the present example, it is assumed that mobile terminal 212 is in a dormant state. Prior to transitioning into a dormant state, however, mobile terminal 212 must establish a communication link to have network resources allocated to it. Thus, as a part of initially establishing the call, mobile terminal 212 transmits communication control signals to BTS 208 to set up a call which communication control signals include the mobile station ID. BTS 208 communicates with 1×EVDO PCF 206C, which, in turn, communicates with PDSN 202 to establish the call. PDSN 202 then generates a mobile station ID for mobile terminal 212 to AAA server 224 to authenticate the mobile station ID prior to granting network resources thereto. Thus, once a point-to-point communication link is established between mobile terminal 212 and a device coupled to data packet network 204 by way of BTS 208, 1×EVDO PCF 206C and PDSN 202, mobile terminal 212 transitions into a dormant state as it travels from the cell served by BTS 208 to the cell served by BTS 220. Once within the cell served by BTS 220, it is presumed that mobile terminal resumes activity and communications through PDSN 216 as is defined by the standards and known by those of average skill in the art. One problem, however, is that PDSN 202 does not realize that mobile terminal 212 has transitioned, while dormant, to a new cell area. Accordingly, PDSN 202 continues to reserve the resources for a mobile terminal 212 in an "always on" or "always connected" type network implementation. Accordingly, as will be explained in greater detail below, PDSN 202 will periodically generate "ping" requests to mobile terminal 212 to ensure that it is still within the cell area served by it through BTS 208. Should mobile terminal 212 fail to reply to a "ping" request, and, in the described embodiment, after multiple "ping" requests, then PDSN 202 releases the network resources and tears down the communication link established with mobile terminal 212.

Figure 3:
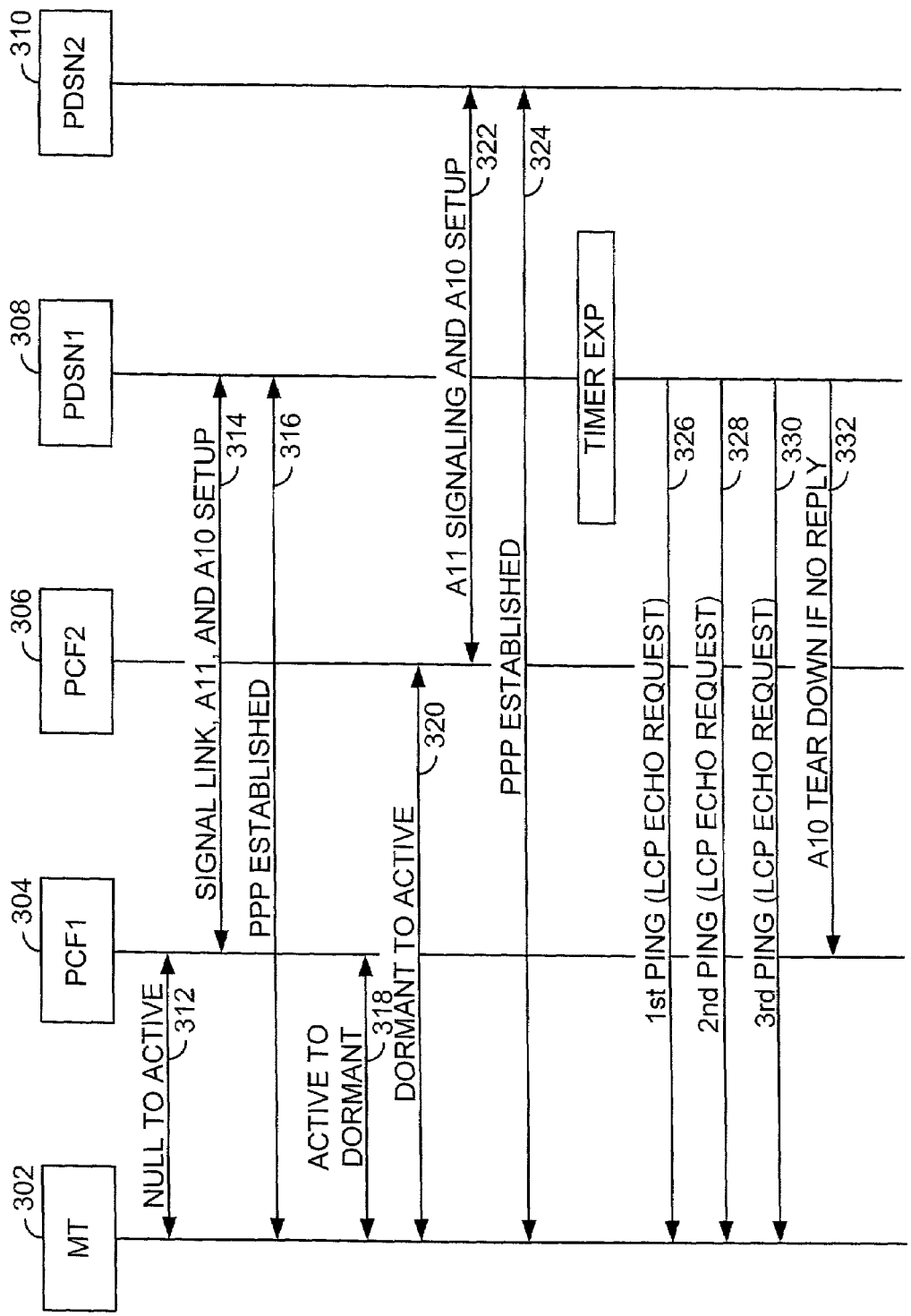
FIG. 3 is a signal sequence diagram that illustrates an embodiment of the present invention.

FIG. 3 is a signal sequence diagram that illustrates an embodiment of the present invention. As may be seen, a mobile terminal 302 is coupled to communicate with a PCF 304, a PCF 306, a PDSN 308 and PDSN 310 in a 1×EVDO network. Initially, a mobile terminal establishes a communication link through the first PDSN. More specifically, mobile terminal 302 establishes a communication link with PDSN 308 by initially transmitting signal 312 to indicate that mobile terminal 302 is transitioning to an active state. As may be seen, signal 312 is transmitted from mobile terminal 302 by way of a BTS (not shown) to PCF 304. PCF 304, thereafter, generates A11 signaling to establish the call and A10 setup signals to PDSN 308 in what is shown as signal 314. As is understood by one of average skill in the art, A11 and A10 refer to defined interfaces between a PCF and a PDSN. Once the call setup signals have been received through A10 interface, as illustrated by signal 314, PDSN 308 and mobile terminal 302 establish a point-to-point protocol communication link as referenced by signal 316. After the creation of the point-to-point protocol communication link, mobile terminal 302 transitions to a dormant state with respect to PCF 304 (and therefore, PDSN 308) as is reflected by signal 318. Thereafter, mobile terminal 302 transitions to a new geographic area and transitions from a dormant state back to an active state as shown by signal 320. Signal 320 represents that mobile terminal 302 has generated communication signals to PCF 306. PCF 306, accordingly, generates the A11 signaling and A10 setup signals in the signal represented as signal 322 to PDSN 310. Thereafter, PDSN 310 and mobile terminal 302 establish a point-to-point protocol communication link as shown by signal 324. At this point, the point-to-point protocol communication link is established between mobile terminal 302 and PDSN 310 although PDSN 308 is not aware of this because the present protocols do not provide a mechanism for PDSN 310 to inform PDSN 308 that it no longer needs to reserve resources for mobile terminal 302. Accordingly, according to one embodiment of the present invention, PDSN 308 includes an internal timer that is activated after the establishment of the communication link illustrated as signal 316. The specific operation of the time will be explained in greater detail below. In the present invention, however, the timer is reset each time data is transmitted from mobile terminal 302 to PDSN 308 or a signal, such as an acknowledged signal or reply signal is received by PDSN 308 from mobile terminal 302. If the timer expires without any activity in communications with mobile terminal 302, PDSN 308 generates a "ping" to mobile terminal 302. In the described embodiment of the invention, the "ping" is an "LCP Echo Request" signal. The LCP Echo Request signal is defined in the standards and is known by those of average skill in the art. A mobile terminal 302, upon receiving an LCP Echo Request signal such as signal 326, generates an "LCP Echo Reply" signal to inform the PDSN that it is still present and that the point-to-point protocol communication link should not be torn down. In the present example, an LCP Echo Reply is not received from mobile terminal 302. Accordingly, PDSN 308 generates a second LCP Echo Request as identified by signal 328. If there is still no response, a third LCP Echo Request is generated as represented by signal 330. If mobile terminal 302 does not reply either to signals 326, 328 or 330, PDSN 308 generates signal 332 to PCF 304 over the A10 interface to instruct it to tear down the point-to-point protocol communication link 324. Thereafter, the resources are released and, if necessary, assigned to a subsequent mobile terminal.

Figure 4:
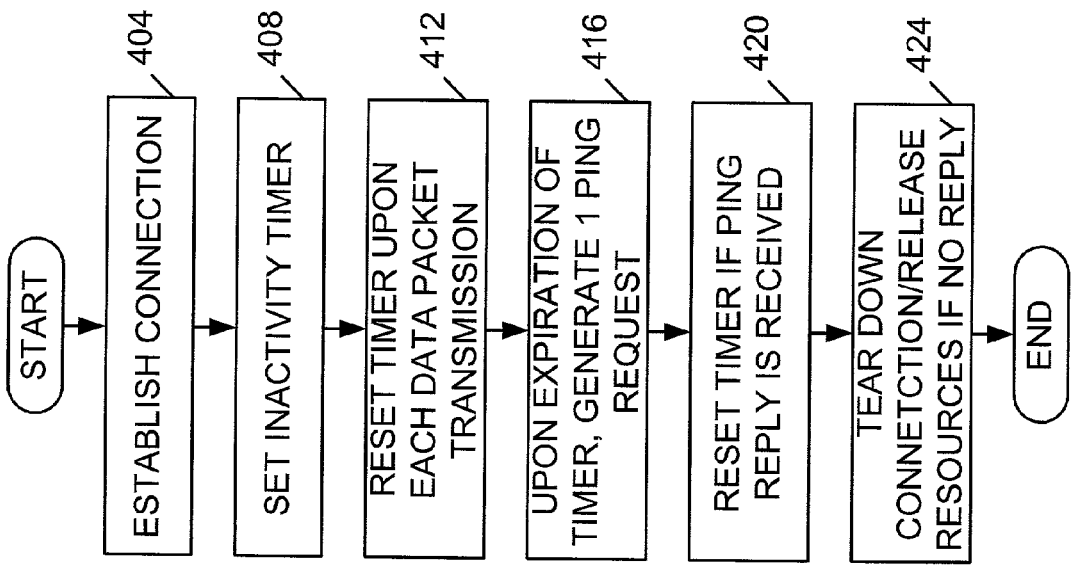
FIG. 4 is a flowchart that illustrates one method of the present invention.

FIG. 4 is a flowchart that illustrates one method of the present invention. Initially, point-to-point protocol communication link is established between a mobile terminal and a PDSN (step 404). Thereafter, an inactivity timer is set (step 408). In one embodiment of the invention, the inactivity timer is reset upon receipt of a data packet or signal from the mobile terminal for which the connection was established in step 404 (step 412). Once the inactivity timer has expired, or counted down to 0, then PDSN generates at least one "ping" request (step 416). In the described embodiment of the invention, the "ping" request is an LCP Echo Request signal. After the "ping" request is generated, the timer is reset if the mobile terminal replied to the "ping" request and the reply is received (step 420). If a "ping" reply is not received after the at least one "ping" request is transmitted, the PDSN instructs the PCF that established the point-to-point protocol communication link to tear down the connection and release the resources (step 424).

Figure 5:
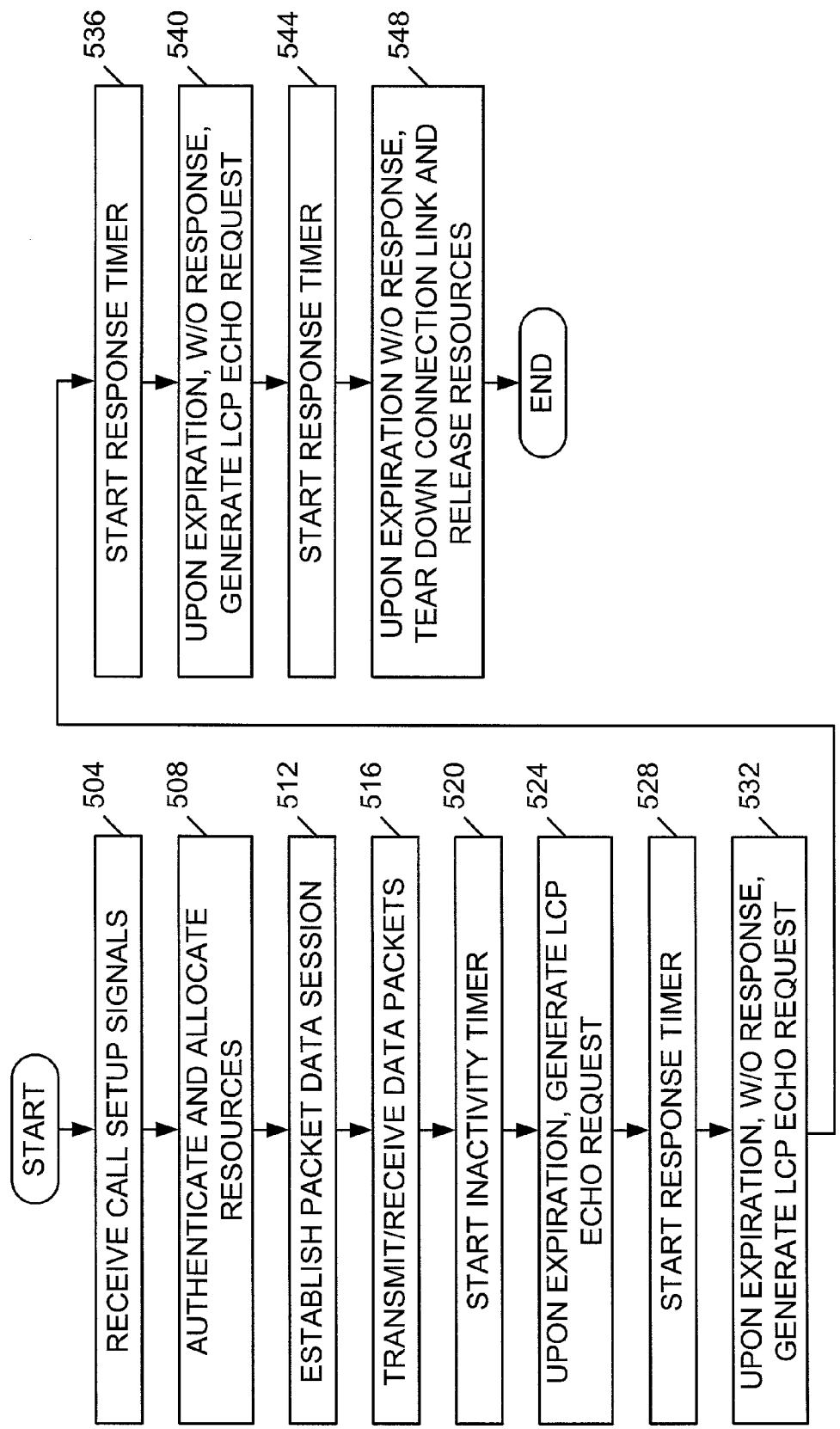
FIG. 5 is a flowchart that illustrates a second aspect of one embodiment of the present invention.

FIG. 5 is a flowchart that illustrates a second aspect of one embodiment of the present invention. In general, the method of FIG. 5, like the method of FIG. 4, is performed by a PDSN. Initially, the PDSN receives call setup signals over the A10 interface from a PCF for a mobile terminal being serviced by the PCF (step 504). Thereafter, the PDSN communicates with an AAA server to authenticate the mobile terminal ID and thereafter allocates resources thereto (step 508). Upon authenticating the mobile terminal ID and communicating with the PCF, a point-to-point protocol communication link, or data packet session, is established between the PDSN and the mobile terminal 512. As is understood, establishing the packet data session means that the PDSN further communicates through a data packet network, and more specifically, to a device to which it is coupled through the data packet network that is providing or receiving data from the mobile terminal for which the communication link was established. Thus, the PDSN transmits and receives data packets between the mobile terminal and the external device coupled to the data packet network (step 516). Once the communication link has been established and data packets are being transmitted and received, the PDSN starts an inactivity timer (step 520). Upon the expiration of the inactivity timer that was set in step 520, the PDSN generates an LCP Echo Request that is transmitted to the mobile terminal by way of the PCF that established the point-to-point protocol communication link (step 524). Once the LCP Echo Request has been generated, the PDSN initiates a response timer (step 528). Upon expiration of the response timer, without a response, the PDSN generates a second LCP Echo Request signal to the mobile terminal (step 532). As soon as the second LCP Echo Request signal is generated to the mobile terminal, the response timer is reset (step 536). Upon expiration of the response timer without a response, the PDSN generates an LCP Echo Request signal to the mobile terminal for a third time (step 540). Thereafter, the response timer is reset again (step 544). After this, if the response timer expires without a response, the PDSN instruct the PCF to tear down the communication link and to release the resources (step 548).

As described herein, the method of FIG. 5 illustrates that the mobile terminal is getting three opportunities to reply to the LCP Echo Request with an LCP Echo Reply signal. This is done to minimize the likelihood of an inadvertent tear down of a point-to-point protocol communication link. The amount of time allocated for the response may vary, but in general is set in keeping with normal periods for such responses as is known by those of average skill in the art. With respect to the inactivity timer, however, that value may be set in many different durations. In the described embodiment of the invention, the inactivity timer is set to a period of hours. One reason that the value is relatively high and is in the range of hours is that a point-to-point protocol communication link that is established for a mobile terminal consumes little resources while the mobile terminal is in a dormant mode or state. Given that each generation of an LCP Echo Request consumes notable network resources, it is undesirable to establish a system that generates a significant number of LCP Echo Requests. In such a case, the cure may be worse than the ailment. According to one embodiment of the present invention, the inactivity timer is therefore set to period of hours.

Figure 6:
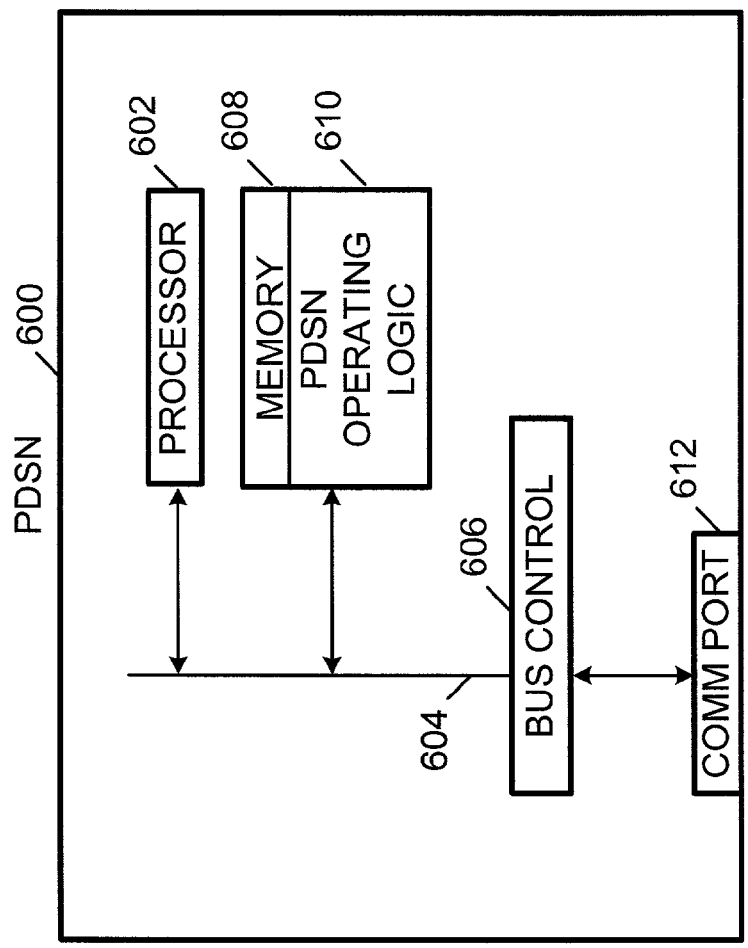
FIG. 6 is a functional block diagram that illustrates one embodiment of a PDSN.

FIG. 6 is a functional block diagram that illustrates one embodiment of a PDSN. Referring now to FIG. 6, a PDSN 600 includes a processor 602 that is coupled to communicate over a bus 604. A bus controller 606 controls communications over bus 604. A memory 608 further is coupled to bus 604 and includes computer instructions that are retrieved by processor 602 over bus 604 for execution. The computer instructions within memory 608 define the operational logic of PDSN 600. For example, memory 608 includes a memory portion 610 that includes computer instructions that define the PDSN operational logic. Specifically, the computer instructions within memory portion 610 define logic for generating the LCP Echo Requests upon the expiration of a timer. More specifically, the computer instructions within memory portion 610 define logic that is described by the signal sequence diagram and flowcharts and other descriptions herein of the present embodiment of the invention. Bus controller 606 further is coupled to a communication port 612 through which PDSN 600 communicates with external devices. Thus, when processor 602 retrieves the computer instructions stored within memory portion 610 and executes them to determine that it should generate an LCP Echo Request, processor 602 formats the signal and transmits it over bus 604 through bus controller 606 and out communication port 612 for transmission to the mobile terminal through the corresponding PCF.

Figure 7:
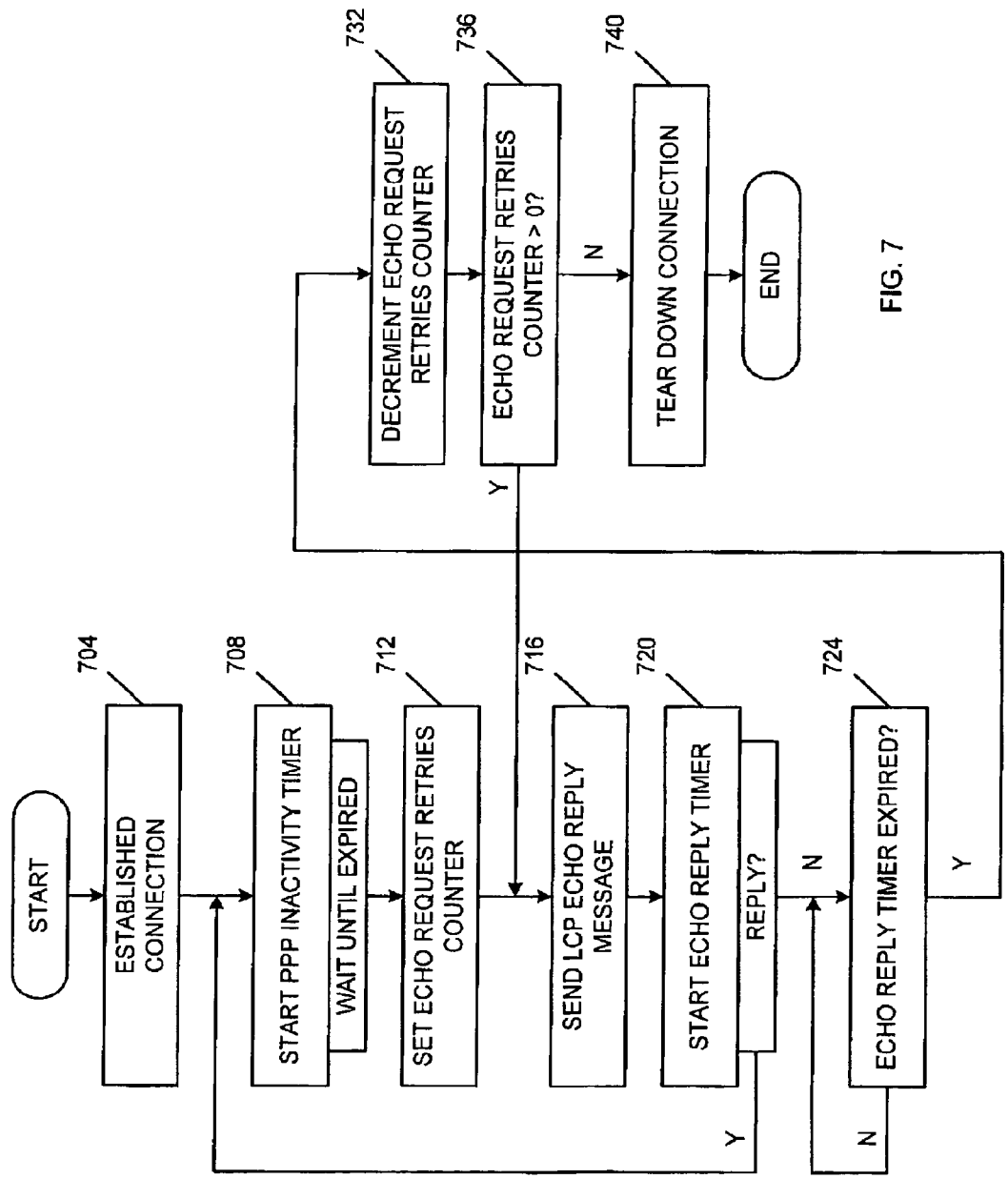
FIG. 7 is a flowchart of a preferred embodiment of the present invention.

FIG. 7 is a flowchart of a preferred embodiment of the present invention. Once a PPP connection is established (step 704), a PDSN starts a PPP Inactivity Timer (step 708). Upon expiration of the PPP Inactivity Timer, the PDSN sets an Echo Request Retries Counter (step 712), sends an LCP Echo Reply Message (step 716), and starts an Echo Reply Timer (step 720). Thereafter, the PDSN monitors for a reply (step 724). If a reply is received, the PDSN stops the Echo Reply Time-Out Timer, resets the Echo Request Retries Counter (step 712) and resets the PPP Inactivity Timer (step 708). Upon expiration of the Echo Reply Time-Out Timer, however, the PDSN decrements the Echo Request Retries Counter (step 732) and determines whether the Echo Retries Counter value is greater than zero (step 736) and, if yes, and generates another LCP Echo Reply Message at step 716. If the Echo Request Retries Counter is zero, however, the PDSN tears down the connection (step 740). In the described embodiment of the invention, the Echo Request Retries Counter is set equal to 3 so that only three LCP Echo Reply Messages are generated.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A packet data serving node (PDSN), comprising:
   a bus coupled to a processor for transmitting computer instructions and control signals to and from the processor within the PDSN;
   memory coupled to the bus, the memory including computer instructions that define operational logic for causing the PDSN to generate a Link Control Protocol (LCP) Echo Request signal to a mobile terminal upon specified conditions; and
   a processor for executing computer instructions wherein the processor retrieves the computer instructions from the memory over the bus and executes the computer instructions to generate a first LCP Echo Request signal after expiration of a timer to determine if a mobile terminal for whom a communication link or session has been established is located within an area served by the PDSN.

2. The PDSN of claim 1 wherein the computer instructions stored within the memory define logic to prompt the processor to set an inactivity timer and to generate the first LCP Echo Request signal upon expiration of the inactivity timer.

3. The PDSN of claim 2 wherein the computer instructions define logic to prompt the processor reset the inactivity timer every time the data packet or control signal is received from the mobile terminal.

4. The PDSN of claim 3 wherein the computer instructions define logic to set the inactivity timer to a value that is equal to or exceeds one hour.

5. The PDSN of claim 1 wherein the computer instructions stored within the memory further define operational logic to prompt the processor to generate a second LCP Echo Request if a reply is not received from the mobile terminal within a specified period after the first LCP Echo Request was generated.

6. The PDSN of claim 1 wherein the processor generates at least three LCP Echo Requests if a reply is not received for either a first or a second LCP Echo Request that was generated.

7. The PDSN of claim 6 wherein the computer instructions further define operational logic to prompt the processor to set a response timer each time one of the at least three LCP Echo Request is transmitted wherein the processor does not either retransmit another LCP Echo Request or determine to tear down the point-to-point protocol communication link established with the mobile terminal until expiration of the response timer.

8. A communication network including a wireless communication network portion for establishing "always on" type communication links for transmitting data, the network comprising:
   radio transceiver circuitry for establishing a radio frequency (RF) communication link with a mobile terminal;
   a base station controller/access network controller (BSC/ANC) for establishing and controlling the RF communication link, the BSC/ANC coupled to communicate with the radio transceiver circuitry and to transmit and receive communication signals thereto and therefrom, respectively;
   a packet control function (PCF) network element coupled to the BSC/ANC, the PCF for converting data between an IP protocol and a wireless network protocol; and
   a packet data sewing node (PDSN) coupled to the PCF, the PDSN for establishing a connection between a packet data network and the PCF, the PDSN further including logic to generate an inactivity timer and to generate an LCP Echo Request upon expiration of the inactivity timer is present in an area served by the PDSN.

9. The communication network of claim 8 wherein the PDSN further includes logic to tear down a communication link if the PDSN does not receive an LCP Echo Reply from the mobile terminal within a specified period after generation of the LCP Echo Request.

10. The communication network of claim 9 wherein the PDSN does not tear down the communication link unless an LCP Echo Reply was not received after the LCP Echo request was generated a plurality of times.

11. The communication network of claim 10 wherein the plurality of times comprises at least three times.

12. The communication network of claim 8 wherein the inactivity timer is set to a value that is equal to or exceeds one hour.

13. The communication network of claim 8 wherein the inactivity timer is set to a value that is within a range of magnitude of approximately three hours.

14. A method for determining to tear down a communication link with a mobile terminal in a wireless network, comprising:

creating the communication link;

setting an inactivity timer after creating the communication link;

resetting the inactivity timer each time a signal is received from the mobile terminal; and upon expiration of the inactivity timer, generating one of an LCP Echo Reply, and ICMP Echo Reply or a ping to the mobile terminal to determine if the communication link should be torn down.

15. The method of claim 14 further including resetting the inactivity timer if a reply is received from the mobile terminal.

16. The method of claim 15 further including generating a second one of an LCP Echo Reply, an ICMP Echo Reply or a ping if the reply is not received within a specified reply time.

17. The method of claim 16 further including generating a third one of an LCP Echo Reply, an ICMP Echo Reply or a ping if the reply is not received within the specified reply time.

18. The method of claim 17 further including determining to tear down the communication link if the reply was not received to any one of the first, second or third generated LCP Echo Replies, ICMP Echo Replies or pings.

19. The method of claim 14 wherein generating the ping comprises generating an LCP Echo Request signal and the reply comprises receiving an LCP Echo Reply signal originated by the mobile terminal.

* * * * *